Jan. 15, 1957  J. V. FREDD  2,777,746
AMPLIFYING RECORDER FOR TUBING CALIPERS
Filed Feb. 24, 1955  5 Sheets-Sheet 1

INVENTOR.
JOHN V. FREDD
BY Robert O. Spindle
ATTORNEY

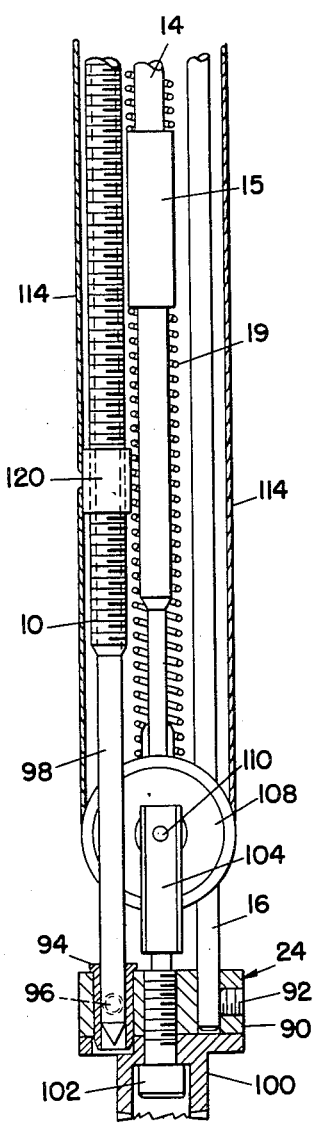
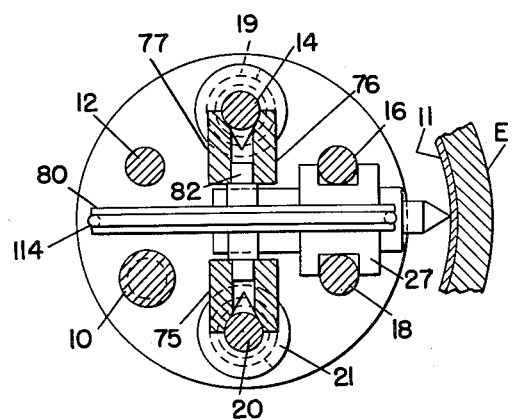
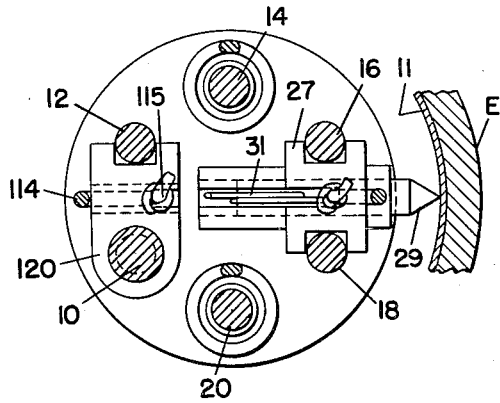

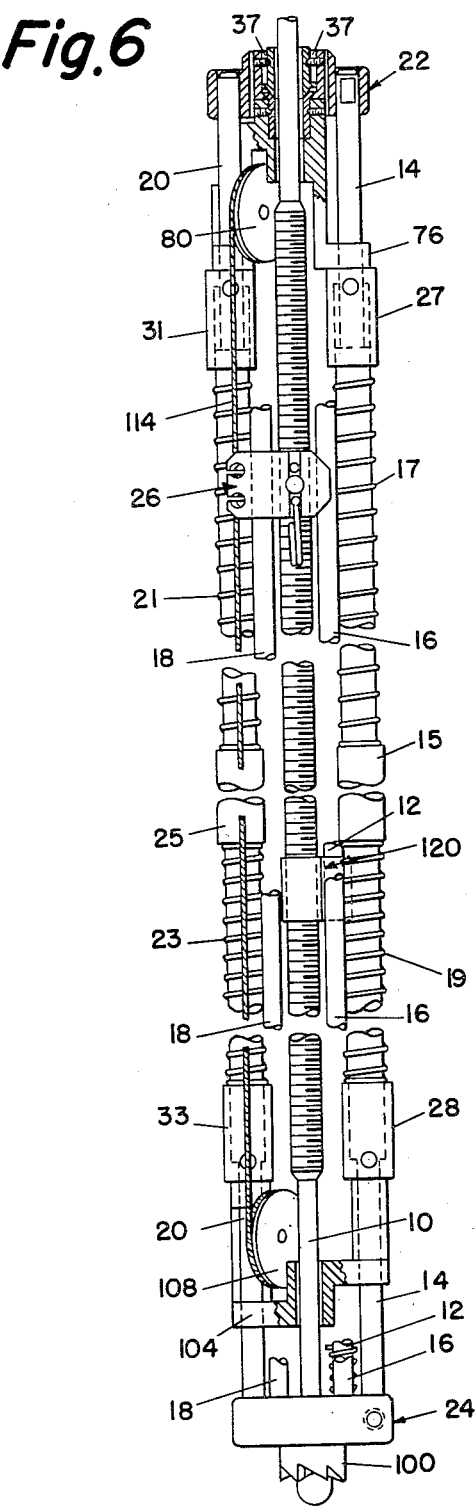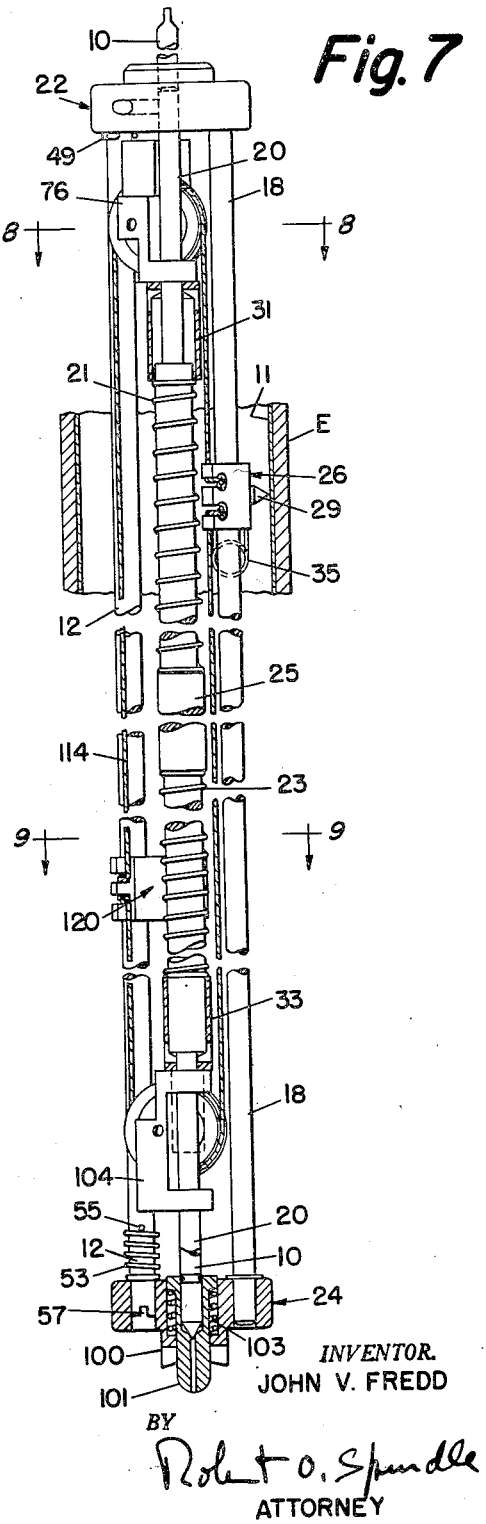

Jan. 15, 1957  J. V. FREDD  2,777,746
AMPLIFYING RECORDER FOR TUBING CALIPERS
Filed Feb. 24, 1955  5 Sheets-Sheet 4

INVENTOR.
JOHN V. FREDD
BY
Robt O. Spurdle
ATTORNEY

Jan. 15, 1957   J. V. FREDD   2,777,746
AMPLIFYING RECORDER FOR TUBING CALIPERS
Filed Feb. 24, 1955   5 Sheets-Sheet 5

INVENTOR.
JOHN V. FREDD
BY
Roberto Spindle
ATTORNEY

United States Patent Office 2,777,746
Patented Jan. 15, 1957

2,777,746

AMPLIFYING RECORDER FOR TUBING CALIPERS

John V. Fredd, Dallas, Tex., assignor to Otis Pressure Control, Inc., Dallas, Tex., a corporation of Delaware Application February 24, 1955, Serial No. 490,389

9 Claims. (Cl. 346—111)

The present invention relates in general to tube calipering devices and more particularly to the recording mechanisms which are contained in the housing of such devices and respond to the movement of the surface sensing elements in the calipering operation.

Self-contained tubing calipers of the mechanical type, as distinguished from electrical devices, normally record the movement of surface sensing elements by direct transmission to the recording elements. The chart result of this normal device is a spiral curve in which the tube surface variations are the reflection of the movement of the sensing members. Where bell crank feelers are used, for example, the movable recording element responds to the ratio of the outwardly projecting leg of the bell crank to the inwardly projecting leg. Due to physical limitations and desired sensing characteristics, the most practical design for such feeler-recorder ratio is 1 to 1. However, the record made by such limited response often lacks clarity and is not easily measured to the desired degree of accuracy. It is, therefore, an object of this invention to provide simple means for amplifying the movement of the surface sensing elements in making the tubing calipering record.

As is shown in my currently pending application Ser. No. 234,714, filed July 2, 1951, for a "Tubing Caliper," now Patent No. 2,708,316, it is possible to introduce a multiplying sub-assembly between the sensing elements and the recorder mechanism. It will be evident from a reading of that application that such a sub-assembly requires cooperating elements and structural changes which prevent universal application in existing calipers. For example, such additional mechanism could not be used in the calipers shown in my Patents 2,578,236; 2,596,924; and 2,637,117 without adopting the structural modifications taught in the above-noted application. It is, consequently, a principal feature of this invention to provide recording means for interchangeable use with calipering devices of this type which will produce an amplified record of the movement of the feeler or sensing elements.

In the references cited and referred to as a "type" of caliper, a mechanically operated device which is lowered or "dropped" as a unit by a suitable wire line into tubing containing fluids under pressure is intended. Such devices effect a continuous record of the internal surface configuration of the tubing as it passes therethrough. These mechanisms are most frequently used in calipering tubing used in well bore operations, and are of the self-contained type, in which are housed the recording elements mentioned here, as part of the mechanism. The drive frame assembly for the stylus in the chart chamber as disclosed in this application may be used in any tubing calipering operation with any calipering means capable of actuating its several parts. Further it may be readily adapted for use with any fixed chart in a chart chamber in such devices. The apparatus of this invention, although indicated in the drawing as forming a part of a complete caliper of special design following the apparatus disclosed in my above numbered patents, is intended as a distinct sub-combination of such instruments and may be incorporated with these and similar devices.

This mechanism comprises a stylus drive frame for insertion in a tubing caliper chart chamber. It is adapted to rotate in the chamber by being provided with means to engage the driving mechanism with which the caliper is provided. A reciprocating means is mounted in the drive frame and is contacted by the surface sensing elements, or feelers, to receive calipering movement. The stylus is slidably mounted and positioned on the frame to engage the fixed chart in scribing contact. By means of a travelling nut threadedly engaging a rotating lead screw, separate pulleys mounted in the opposite ends of the drive frame, and a flexible cable connecting the slidable stylus and travelling nut together, over the separated pulleys, the stylus is caused to travel the chart distance and mark the surface irregularities thereon. The assembly of elements is arranged to cause the stylus to amplify the received feeler movement on the chart yet continue its regulated spiral trace as controlled by the lead screw without deviation. The result is a chart record of the surface calipering amplified to show with measurable exactitude the feeler movement. It is, therefore, a further object of this invention to provide an improved recording stylus drive frame which will amplify the calipering data affording more legible and accurate chart records.

These and other objects will be evident from a reading of the following description of the device where reference is made to the accompanying drawing, in which:

Figure 3 is a sectional elevation of the lower portion of the device completing Figure 2.

Figure 2:
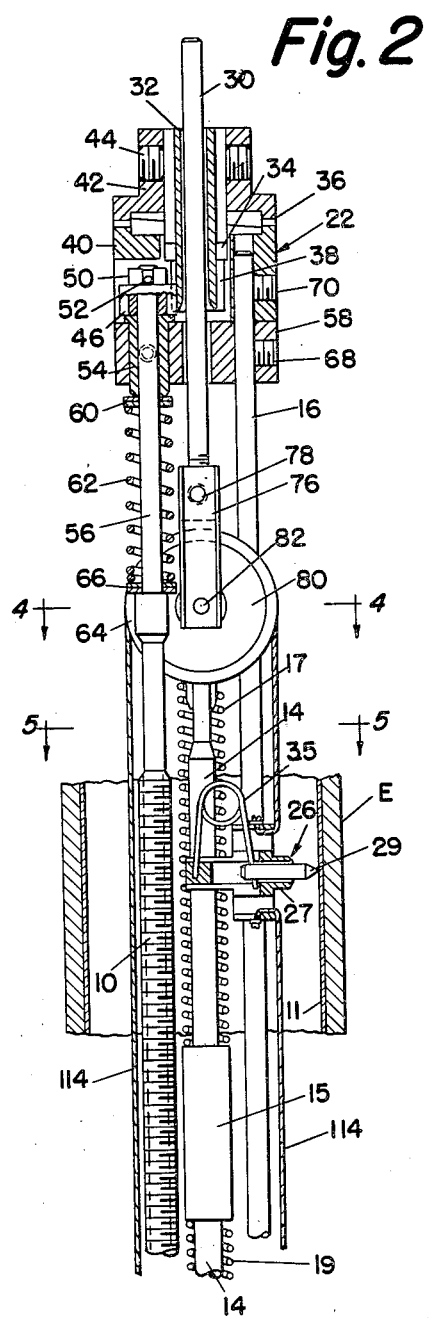
Figure 2 is a sectional elevation of the upper portion of one form of the invention.

Figures 4 and 5 are cross-sectional views of Figure 2 taken on lines 4—4 and 5—5.

Figure 6 is an elevational view of an alternate form of mechanism, shown partly in section.

Figure 7 is an elevational view of the device shown in Figure 6 rotated to show additional elements.

Figure 8:
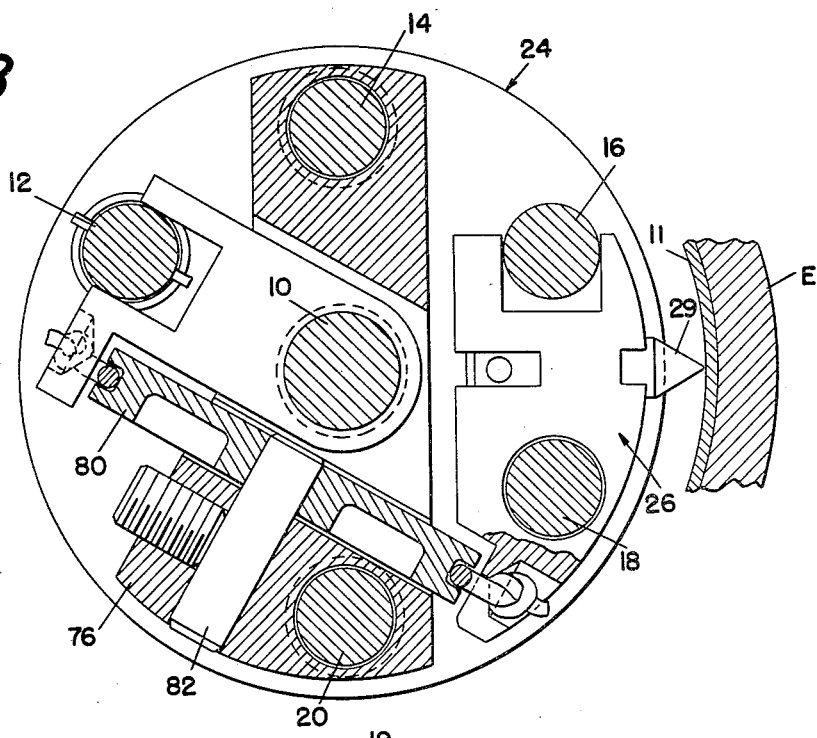
Figure 9:
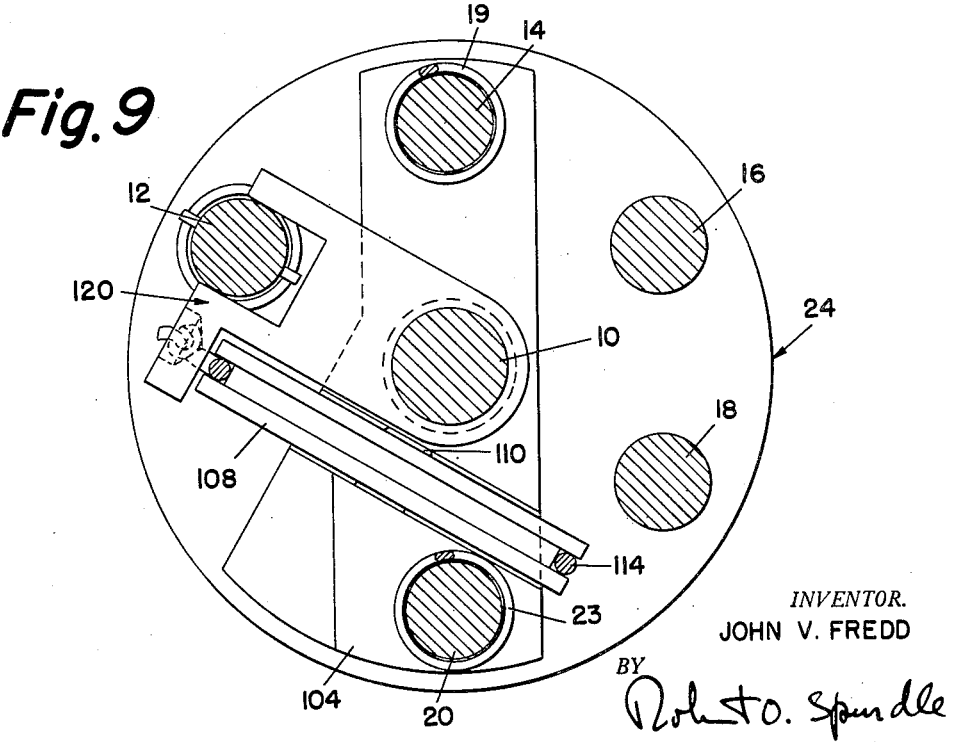

Figures 8 and 9 are cross-sectional views of Figure 7 taken on lines 8—8 and 9—9.

Figure 10:
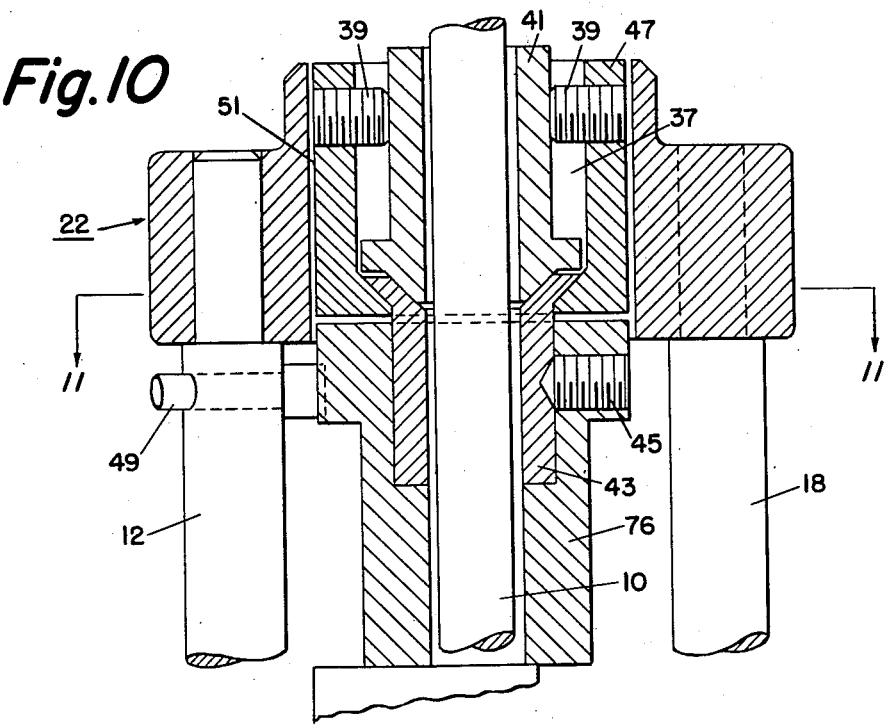

Figure 10 is an enlarged elevational detail in section of the upper part of Figure 6 rotated through 30 degrees into the position shown in Figure 7.

Figure 11:
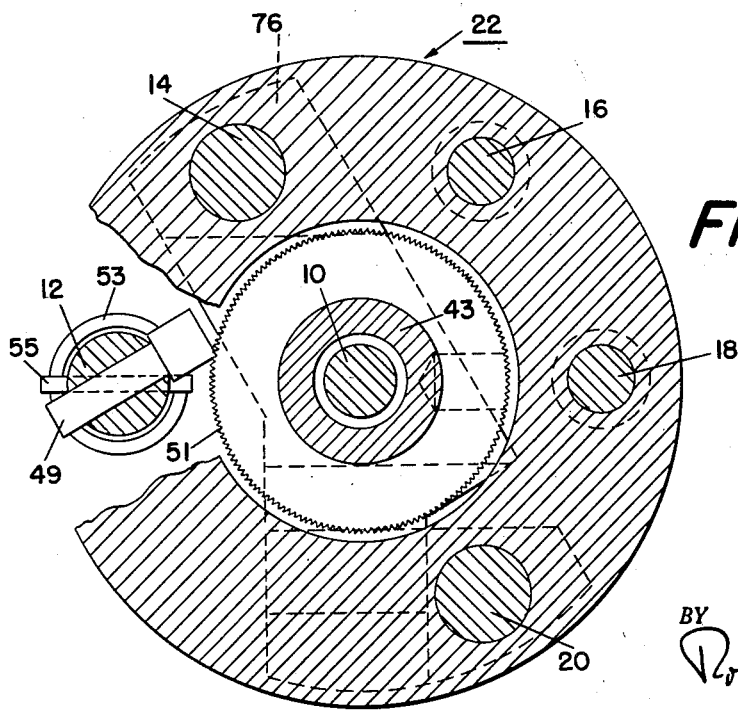

Figure 11 is a cross-sectional view partly broken away of Figure 10 taken on line 11—11.

Figure 1:
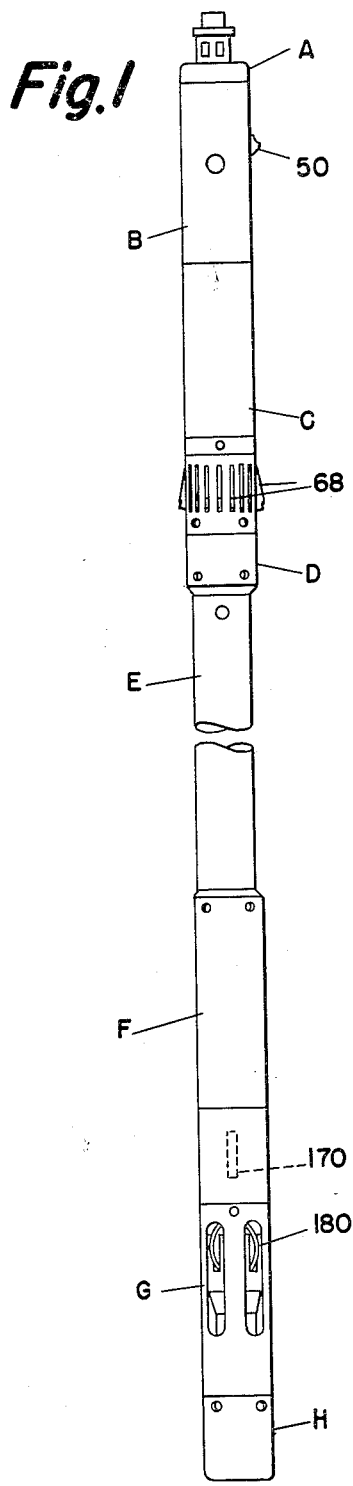
Figure 1 is an elevational view of a complete calipering device.

To illustrate one form of caliper with which the amplifying stylus drive frame as here disclosed can be used to advantage, Figure 1 shows a completely self-contained well bore caliper of the mechanical type. For a full understanding of the complete calipering device and its operation, reference is again made to the above noted patents. As the sub-combination here described and claimed refers only to the stylus drive frame portion of the recording mechanism, this disclosure will be confined to the recording portion of the caliper. Reference will be made, as required, to the major operating elements which actuate the recording elements, but will not include other structure. In addition to simplifying the description, this disclosure is thus limited because the stylus drive frame as described may be used with like calipers and similar recording mechanisms and is not devised solely as an improvement for one form of device.

Referring now to Figure 1, the top sub A is the connection by means of which the caliper is suspended in the tubing. Release assembly B is advantageously placed between the sub A and the feeler head assembly C to connect the two and to withhold the feelers 68 from the calipering operation until released by movement of dog 50. The stylus bushing assembly D operably connects the chart chamber section E to the feelers 68 whereby the reciprocating motion of the recording stylus is obtained. Section E, the chart chamber, is our main consideration as it houses the stylus drive frame of this invention, which will be described later in detail. Ratchet assembly section F, drive wheel 170, the stylus driving mechanism G with the loading wheels 180, and plug H complete the lower portion of this typical caliper. Except for general reference to these sections and the numbered elements to make clear the details and operation of the stylus drive frames disclosed here, no further reference will be made. The operating motions for the recording elements can be obtained from many sources. Specific operating elements are included here only by reference, and as these will not be claimed specifically will not be discussed further.

Figure 2 is a sectional view of the upper portion of one form of the stylus drive frame of this disclosure. As previously noted the lower portion is illustrated in Figure 3 with cross-sections in Figures 4 and 5. This form of the two alternative combinations selected to show the principles of the invention is drawn in enlarged detail for purposes of clarity. The alternate device indicating another practical form, and showing one of many possible combinations to achieve the same result, is drawn in both larger and smaller scale but with sufficient views (Figures 6 to 11 inclusive) to well illustrate all details. In both instances the chart chamber is indicated by showing portions of the housing for section E and the chart 11 is positioned for cooperation with the stylus. The necessary connections to receive operating movement as required are shown in the elevational views.

Returning now to Figures 2 through 5, an embodiment is shown in which the rotatable lead screw 10 is relatively fixed against longitudinal reciprocation and is eccentrically positioned to form the sixth of a plurality of peripherally spaced frame rods. These rods 12, 14, 16, 18 and 20, together with lead screw 10, are clearly shown in cross-section Figures 4 and 5. Within this framework of peripherally spaced rods, positioned and terminated by upper and lower operating assemblies, collectively numbered 22 and 24 respectively, the stylus assembly 26 and its operating mechanisms are enclosed (Figs. 2 and 3). As constructed, this framework extends the full length of section E, enabling the stylus to work on the entire chart surface.

Beginning at the top of Figure 2 and proceeding downwardly, the upper operating assembly 22, including a ratchet assembly 36 and an end plate 58, is drilled longitudinally to position connecting rod 30 in sliding engagement. Stylus bushing gear 32 concentrically positioned on connecting rod 30 is free to rotate relative thereto. Ratchet bushing 34 enters the gear 32 in the ratchet assembly 36 above the toothed portion 38 of the stylus bushing gear 32 and below the stop ratchet 40. Above the stop ratchet 40 and in operating engagement therewith, the stylus bushing ratchet 42 is rotatably mounted concentric with the connecting rod 30 and stylus bushing gear 32, being drilled and tapped as at 44 for set screw fastening to operating elements.

Positioned to operably engage the elongated toothed portion 38 of the stylus bushing gear 32, is the lead screw gear 46 fixed to the lead screw 10 by slotted end 50 fastened by pin 52. Supporting bushing 54 journals the unthreaded extension 56 of lead screw 10 through the end plate 58. This bushing 54 is flanged to engage the top of the end plate 58 acting as a bearing surface for the gear 46, and extends below the plate into engagement with washers 60 supported in contact by the lead screw spring 62. By means of a shoulder portion 64 on lead screw 10 and duplicate washers 66 the spring 62 is held in compression, maintaining lead screw 10 in position yet preserving flexibility of operation as will be understood later.

It will be evident by referring to Figures 3, 4 and 5 in addition to Figure 2 that the drive frame rods extend into the end plate 58, and in some instances through the end plate into the stop ratchet 40 as shown in Figure 2 relative to rod 16. Set screws 68 and 70 for rod 16, and similar fasteners for rods 12, 14, 18 and 20, secure the upper operating assembly 22 in fixed relation to the rods and other elements.

Continuing with reference to Figure 2, the connecting rod 30 slidably extends through the stylus bushing gear 32, threadedly engages pulley slide 76, and is securely connected by set screw 78. Pulley 80 is rotatably supported as by bearing pin 82 in the pulley slide 76 and is longitudinally responsive to all such movement transmitted through connecting rod 30.

Before considering the stylus, its support and position in the device relative to the above-described elements, reference is made to Figure 3 for a description of the lower operating assembly 24 and its component parts. An end plate 90 drilled to receive the spacer rods 12, 14, 16, etc., and including set screws as 92 shown for rod 16, is also drilled to receive lead screw bushing 94. This bushing slidably engages the hole in plate 90 and is fastened as by set screw 96 to the finished portion 98 of the lead screw 10 below the threaded portion. It will be evident that this transfers wear from the lead screw to a less expensive more easily replaced bushing.

The driven portion 100 of a clutch assembly, the driving portion not being shown here but which forms a typical driving mechanism as disclosed in the patents of reference and otherwise well known in the art, operably engages the end plate 90, turning it when driven. Connective of the lower assembly 24 passing through the driven clutch element 100 and end plate 90, a cap screw 102 holds the driven portion 100 of the clutch in place. The driven portion 100 of a clutch assembly is thus secured to the end plate 90, turning it when driven. A lower pulley 108 is rotatably supported in lower pulley slide 104 on axle or bearing pin 110 and is free to move longitudinally of the drive frame during calipering.

Figure 4 illustrates the preferred form for the upper and lower pulley slides. In this instance a sectional view of upper pulley slide 76 is shown. Lower pulley slide 104 is exactly like slide 76 and is engaged by the same spring embraced rods 14 and 20 as will be detailed.

As shown in the sectional view under discussion, the pulley slide 76 is slotted to receive the pulley 80 mounted by pin 82. The cable 114 passes over this pulley as shown and extends downwardly on each edge of the periphery, indicated in dotted line. The vertical portions of the pulley slide 76 numbered 75 and 77 for clarity, in addition to being drilled to position the pulley bearing pin 82, are grooved, vertically, to slidably engage rods 14 and 20. By so engaging these rods positioned diametrically opposite each other the pulley slides, upper and lower, are aligned to engage the cable 114.

It will be evident that in order to transmit the reciprocal motion of connecting rod 30 to the stylus assembly 26, yet to be described, by means of the cable connector, the separated pulleys 80 and 108 must remain separated and yet move simultaneously under the same influence. This is accomplished by mounting springs on pulley slide engaging rods 14 and 20 arranged to urge the slides apart as far as possible from a fixed point on each of the rods.

The structure accomplishing this result is shown in Figures 2, 3 and 4. As indicated on Figure 2, rod 14 is enlarged at 15 which is positioned slightly above the longitudinal center of the drive frame and forms fixed shoulders against which springs 17 and 19 abut. By such positioning of the enlarged portion springs 17 are under more compression than opposed springs 19 with the resultant additional force upwardly as a stylus lift spring maintaining cable tension and holding the stylus rod in operating engagement with the feelers. Spring 17 in turn abuts against the notched engaging portion 77 of upper pulley slide 76 (Fig. 4) urging the slide as far upwardly as is possible. Spring 19 performs the same operation against the lower pulley slide 104 as shown in Figure 3.

Except as shown in the sectional views, Figures 4 and 5, there is no illustration showing this identical structure for rod 20. The cutting plane establishing Figures 2 and 3 leaves rod 20 and the spring structure 21 which balances the forces separating upper and lower pulley slides off the drawing. From a consideration of Figures 4 and 5, however, this construction is sufficiently indicated and will be readily understood as a duplicate of spring-and-rod 14 structure.

It now remains to describe the stylus and its operating mechanism as related to the presently described elements. Figures 2, 4 and 5 connect, detail and position the stylus sub-combination for easy description. A holder 27 designed to position the stylus point 29 urged into contact with chart 11 by the effect of spring 35 receives the cable 114 as shown. Two plan views, Figures 4 and 5, shows a notched or grooved arrangement with which to engage rods 16 and 18, assuring transverse and lateral control of the point while the stylus is moved vertically in the drive frame.

This vertical movement, that is to say the constant movement apart from the reciprocating action necessary to point-up the undesirable pits and defects in the tubing, is the result of the travelling nut 120 movement in response to rotation of lead screw 10. Figures 3 and 5 show elevation and plan views of the traveling nut and its operating elemnts. The body of the nut 120 is drilled and tapped to threadedly engage the lead screw 10. Transverse holes admit and permit cable 114 to be fastened as by knot 115. Spaced from the threaded lead screw 10 to engage a grooved portion of the travelling nut, rod 12, the last of those originally described and not used until this time for purpose other than a spacer or fastener, engages the nut 120 holding it in operating position as it travels vertically on the drive frame.

Before describing an alternate structure as shown in Figures 6 to 9 inclusive, which serves the same purpose but permits a relocation of elements in simpler arrangement, the operation of the above structure will be described. By completing the description of this form of device at this time, advantage is taken of the description recently made, and permits briefer description and easier understanding of the alternate structure described later.

As indicated above, the presently described drive frame is intended for use in known tubing calipers as shown in the above noted patents, and will be provided with proper activation by the driving and operating elements, or like means, shown there. Further, as also indicated, the eccentric positioning of the rotatable lead screw adapts this form of the invention for special calipering work which cannot be accomplished as readily with the device to be later described. For proper operation, these means must include surface sensing elements such as feelers 68 here discussed and a rotating means to engage the driven clutch 100 on the base of the frame. This motion is normally supplied by the friction drive wheel 170 noted here as a part of Figure 1.

With these operating means supplied, the response of the disclosed driving frame in the recording operation is as follows. The driven clutch 100, engaged by a driving member not shown, rotates the frame shown in Figures 2 and 3. The direction of rotation is determined by the clutch 100 and the ratchet head in the upper assembly 22. Under proper rotation the upper and lower parts of the ratchet are arranged to stop the rotation in the wrong direction. The teeth are shaped to engage and hold in one direction of rotation and designed to slide over each other for contrary movement. By fastening the stylus bushing ratchet 42 against freely turning and permitting the stop ratchet 40 to turn in controlled direction relative thereto, the frame is rotated correctly.

Rotation of the stop ratchet 40 by means of the rotary motion of the driven clutch 100 is transmitted through the rods 12 to 20 inclusive, moves the lead screw gear 46 about the stylus bushing gear 32 which is held stationary together with the stylus bushing ratchet 42. By proper gear and thread ratios it will be evident that the resulting vertical movement of the travelling nut 120 can be predetermined for best chart results. The selected thread pitch on the lead screw engaging the travelling nut 120 which, in turn, is held against rotation by engaging rod 12 as in Figure 5, moves the travelling nut longitudinally of the chart 11 at a constant rate. As the stylus holder, with included stylus, is connected by cable 114 to the travelling nut 120, the stylus is moved in direct response thereto and scribes a helix on the chart as the frame rotates. The spacing of the parallel lines of the scribed helix is directly related to the pitch of the lead screw and can be regulated by increasing or decreasing the lead screw pitch together with the stylus bushing gear 32 and lead screw gear 46, in this instance.

Reciprocatory motion of the pulley slides and included pulleys is the result of feeler motion transmitted to connecting rod 30. In the preferred caliper structure as disclosed in the patents of reference above, this movement is caused by one or more of a plurality of feelers extending into calipering contact with the inner wall of a tube. In those examples the feelers are arranged to transmit a radial measurement of the deepest pit encountered regardless of the movement of other surface sensing elements at that instant. It will be evident that the drive frame disclosed here will respond to this movement, or to any other feeler arrangement capable of transmitting reciprocal motion to the pulley combination.

In response to such movement, the upper pulley slide 76 slides vertically in the frame against or with the spring effect positioning it. The cable 114 being of fixed length and reasonably non-elastic moves over the upper and lower pulleys, requiring the lower slide and pulley to move correspondingly. Travelling nut 120 is relatively fixed, being limited to that movement longitudinally of the drive frame afforded by rotation of threaded lead screw 10. Thus the stylus assembly 26 moves vertically in response to the upper pulley slide movement a distance effected by cable 114. The amount of movement transmitted to the stylus 29 is twice the movement distance imparted to the pulley slide, which amplifies the charted record for easier and more accurate measurement.

An alternate structure for accomplishing the same result of amplified or multiplied caliper recording is shown in Figures 6 to 11 inclusive. Where the above described drive frame peripherally or eccentrically positioned the lead screw, requiring it to be rotated in addition to the frame thereby lending additional flexibility of operation, the alternate structure will show a centrally positioned lead screw fixed against rotation as well as against reciprocation. It will be recognized that the first frame with the non-reciprocating, rotating lead screw combines a dual rotation of elements together with the frame affording lighter working parts and a lead screw of reduced pitch. Similarly the alternate device, now to be described, has advantages such as sturdier construction, more compact arrangement, and fewer movable parts. In both cases of these illustrated mechanisms, the multiplier elements are the same, operate alike, and produce the same charted improvements.

Referring now to Figure 6, the alternate drive frame is shown in elevation partly broken away for clarity of description. Where the elements duplicate those of the previously described arrangement, as is the rule rather than the exception, these elements will be numbered the same to facilitate the comparison and a better understanding. At the same time the differences in structure and arrangement will be described to emphasize the variations in structure.

As illustrated and described above for the original structure, the alternate arrangement includes upper and lower operating assemblies 22 and 24. Five spacer rods 12, 14, 16, 18 and 20 maintain these assemblies in spaced apart operating position. In contrast with the first described adaptation, this lead screw is centrally positioned, concentric with the spacer rods and end assemblies 22 and 24 and neither reciprocates nor rotates. The upper portion of the lead screw is machined to pass through the upper pulley slide 76 permitting free rotation of the frame elements about it. Lead screw bearing 101, urged upwardly by spring 103, supports lead screw 10 in fixed position, maintaining the free rotatability of the frame about the lead screw.

The upper and lower pulley slides 76 and 104 are drilled to engage diametrically opposed spacer rods 14 and 20 as indicated in Figure 6 and sectionally illustrated in Figures 8 and 9. They are maintained in spaced relation with each other by upper springs 17 and 21, and by lower springs 19 and 23 on rods 14 and 20 respectively. Reference to Figures 6 and 7 shows this structure clearly. Enlarged sections 15 and 25 on these respective rods form abutments above the center portion by which the upper and lower springs operate separately from each other, and in slight unbalance as previously explained for better operation. Spring bushings for these springs numbered 27 and 31 for the upper sections and 28 and 33 for the lower abut the respective pulley slides in operating contact.

A clearer understanding of the operability of the pulley means described above will be gained by reference to Figures 10 and 11 in conjunction with Figures 6 to 9, inclusive, just described. Of these Figures 6 and 10 clearly show annular space 37 interrupted by a pair of set screws 39. A sleeve 41 is centrally positioned about the upper, unthreaded portion of lead screw 10 by these set screws 39, and retains a lower sleeve 43 supporting pulley slide 76 by means of set screw 45 in operating position. The outer ring of the annular space 37 is rmed by a connector 47 which initially positions set screws 39. This annular space and the set screws receive and engage a J notched connector attaching the reciprocable slide elements to receive feeler movement.

Under normal operating conditions, the stylus 29 similar in all respects to that previously described and clearly shown in Figures 7 and 8, moves from the top of the chart 11 to the bottom. In this completed or finished position, removal of the chart leaving the drive frame in place would destroy the recorded data by scratching the chart surface on the stylus. It is, therefore, required to release the drive frame from the J notched connector and remove the same prior to removing the chart.

For this purpose, rod 12 is constructed as a disengaging element. Reference to Figures 7, 10 and 11 will clarify both the structure and the operation. A headed pin 49 is positioned in rod 12 to extend into operating contact with a knurled surface 51 of connector 47 for the disengaging operation. Lead screw 10 being fixed and connector 47 engaged with the feeler response device, the frame structure is longitudinally slidable relative to the connector and moves the headed pin 49 into engagement with knurled surface 51 as indicated in Figure 11. A spring 53 urging rod 12 upward by contacting a lower pin 55 keeps pin 49 in non-operating position. Rod 12 is slotted as at 57 in the bottom to receive a screw-driver to give a rotating movement, engaging pin 49 in the positioned knurled head surface 51. This movement performed when the drive frame is also rotated, will disengage the set screws 39 from the J slots of the stylus rod (not shown) permitting removal of the drive frame from the chart chamber E.

In order to scribe a basic pitch controlled helix on the chart 11 from which deviations of pits and other interior tubular surface defects can be measured, the travelling nut 120 threadedly engages the centrally positioned lead screw 10. As lead screw 10 is fixed against rotation and reciprocation, the travelling nut is extended to engage rod 12 as shown in Figures 6, 7 and 9, by which it is rotated about lead screw 10, progressing longitudinally of the drive frame at a pace controlled by the pitch of the thread on lead screw 10.

Stylus assembly 26 is slidably suspended on rods 16 and 18 in position to be rotated by the drive frame and hold stylus 29 outwardly urged by spring 35 into scribing contact with chart 11. Cable 114 extends from the travelling nut over the pulleys 80 and 103 and fastens to stylus assembly 26. By this construction the constant, lead screw controlled movement of travelling nut 120 positions the stylus on the chart while the spasmodic feeler sensing movement is transmitted through the pulley means. Reference to Figures 10 and 11 shows the clearances by which this reciprocating movement to the pulley slides is made feasible. The connector means 47 is free to move through the upper operating head 22 and also about the upper portion of lead screw 10. Rotary motion of the drive frame is obtained as previously described for the earlier described form of the invention through the driven clutch member 100, being engaged by a driving mechanism such as friction wheel 170 and intermediate, motion transferring linkages.

This form of the device produces like results of those previously described in a slightly different way, but by means of like elements and like principles. The rotary motion of the drive frame moves the travelling nut and the stylus assembly in direct proportion to the rotary movement of the drive frame about the non-rotatable lead screw. Reciprocating movement of the pulley slides in response to the surface sensing calipering movement moves the pulley means longitudinally of the drive frame. Cable 114 connected to travelling nut 120 and passing over the upper and lower pulleys to connect to the slidable stylus assembly, transmits the lead motion to the stylus. As noted above, the stylus moves twice the distance of the pulleys and thus multiplies the feeler operation transferred to the chart through the stylus.

The disclosed multiplying elements completing the drive frame combination in both the described devices comprises an arrangement of pulleys cooperating with reciprocating elements coupled to the stylus assemblies. Such a combination is used in one instance with an eccentrically mounted lead screw which rotates within a rotating frame, and does not reciprocate. The alternate structure combines the pulley arrangement with a non-rotating, non-reciprocating lead screw. It is evident to those versed in the art that these combinations of the pulley multiplying mechanism can be readily adapted to serve the recording requirements in the several patents cited, and other like devices, with considerable flexibility.

What is claimed is:

1. A recorder for use in a self-contained mechanically operated tube caliper comprising, in combination with an enclosing chart, a drive frame positioned concentrically of the chart and of a length to cooperate therewith, a threaded lead screw extending the length of the drive frame, a travelling nut in relative rotating engagement with the lead screw and in sliding contact with said frame, stylus means in sliding engagement with the frame positioned to scribingly engage the enclosing chart, spaced apart pulleys at opposite ends of the frame, resilient means positioned by said frame and urging said pulleys apart, a flexible cable linking the travelling nut and stylus means together over said pulleys, and reciprocable means engaging the pulleys to move the same longitudinally of said frame during the calipering operation.

2. A recorder for use in a self-contained mechanically operated tube caliper comprising a cylindrically arranged chart, top and bottom assemblies, a frame of peripherally spaced rods operably positioned by the top and bottom assemblies for concentric rotation in said chart, a threaded lead screw eccentrically positioned in said frame extending between the top and bottom frame assemblies, means incorporated in the top assembly to independently rotate said lead screw during the rotation of the frame, longitudinally slidable pulleys mounted in said frame adjacent the top and bottom assemblies, resilient means cooperating with the spaced rods of the frame urging the pulleys apart, a travelling nut in threaded engagement with the lead screw and in sliding contact with one of said rods to resist the lead screw turning movement, a stylus slidably mounted on the frame rods in position to scribe said chart, a flexible cable connecting the travelling nut and the stylus over the top and bottom pulleys respectively, and means extending from the top pulley to receive reciprocable motion for actuation of said stylus through the flexible cable.

3. A recorder for use in a self-contained mechanically operated tube caliper comprising a cylindrically arranged chart, top and bottom assemblies, a frame of peripherally spaced rods operably positioned by the top and bottom assemblies for concentric rotation in said chart, a threaded lead screw concentrically and immovably positioned in said frame extending between the top and bottom frame assemblies, longitudinally movable pulleys slidably mounted in the frame rods at the top and bottom thereof, resilient means urging said pulleys apart, a travelling nut threadedly engaging the lead screw and a frame rod for rotation with the frame, a stylus assembly slidably mounted on another frame rod and positioned to scribe the enclosing chart, a flexible cable connecting the travelling nut and stylus over the said pulleys, and reciprocable means engaging one of said pulleys for cable actuation of the stylus.

4. In tubing caliper recording devices wherein a rotatable frame longitudinally moves a stylus member on a threaded lead screw in scribing contact over an enclosing chart and reciprocable movement is transmitted to said stylus as a calipering function of said device, the improvement in the stylus reciprocating means directed to amplifying the stylus movement comprising a slidable mounting for said stylus means on said rotatable frame positioning said stylus in peripheral engagement with said chart, a travelling nut mounted to rotate in relation to the threaded lead screw, spaced apart pulley means positioned at top and bottom of said frame and reciprocably movable relative to the frame, and a flexible cable connecting the travelling nut and stylus together over said pulley means.

5. A recorder for use in a self-controlled mechanically operated tube caliper comprising, in combination with a cylindrical recording chart, a frame extending through the space enclosed by the chart, a stylus assembly slidable vertically on the frame, means to rotate the frame and thereby impart to the stylus assembly a movement of rotation, spaced apart pulleys at opposite end portions of the frame, a flexible cable passing over said pulleys the ends of which are secured to the stylus assembly, springs positioned on the frame urging said pulleys apart to thereby hold them a definite vertical distance apart limited by the cable length and compel them to move in unison, a vertically extending lead screw held from longitudinal movement relative to the frame, a nut threaded on the lead screw slidable along the frame and secured to the cable whereby the stylus assembly is slidable vertically on the frame, as above specified, during its rotary movement, and actuable means connected to the stylus assembly and imparting thereto, when so actuated, an independent vertically reciprocable movement during the above specified vertical and longitudinal movement of the stylus assembly.

6. The combination specified in claim 5 in which the lead screw is arranged eccentrically relative to the chart and in which means are provided to rotate the lead screw on its axis.

7. The combination specified in claim 5 in which the lead screw is arranged concentric relative to the chart and is held from rotation on its axis.

8. The combination defined in claim 5 which comprises upper and lower assemblies and in which the frame comprises a number of vertically extending rods held between said assemblies and arranged eccentrically relative to the chart, one of which is the specified threaded lead screw, and means to rotate the lead screw on its axis.

9. The combination defined in claim 5 which comprises upper and lower assemblies and in which the frame comprises a number of vertically extending rods held between said assemblies, one of which rods is arranged concentrically, and the others of which rods are arranged eccentrically, of the chart, the first named rod being the specified lead screw, and means holding the lead screw from rotation on its axis.

References Cited in the file of this patent
UNITED STATES PATENTS

| | | |
|---|---|---|
| 2,596,924 | Fredd | May 13, 1952 |
| 2,619,900 | Clarke et al. | Oct. 21, 1952 |